United States Patent [19]

Boyd

[11] Patent Number: 5,339,919
[45] Date of Patent: Aug. 23, 1994

[54] BOARDING LADDER ASSEMBLY HAVING A VARIABLE COUNTERWEIGHT LIFTING FORCE

[75] Inventor: James W. Boyd, New Berlin, Wis.
[73] Assignee: Harnischfeger Corporation, Brookfield, Wis.
[21] Appl. No.: 14,323
[22] Filed: Feb. 5, 1993
[51] Int. Cl.⁵ .............................................. E06C 5/04
[52] U.S. Cl. ........................................ 182/85; 182/98; 182/127
[58] Field of Search ............................ 182/84–86, 182/127, 98; 280/166; 248/364

[56] References Cited

U.S. PATENT DOCUMENTS 2,084,303  6/1937  Applegate ............................ 182/85
4,243,120  1/1981  Pratt, Jr. et al. ................. 182/127 X

FOREIGN PATENT DOCUMENTS 1518170  10/1989  U.S.S.R. ............................... 280/166

Primary Examiner—Alvin C. Chin-Shue
Attorney, Agent, or Firm—Michael, Best & Friedrich

[57] ABSTRACT

A boarding ladder assembly for mounting a boarding ladder on a support for movement between raised storage and lowered boarding positions. The assembly includes a guide structure that has first and second guide tracks mounted in spaced diverging angular orientation relative to each other and first and second guide track followers that are mounted therein for changing the angular orientation of the boarding ladder as it is raised and lowered. A counterweight has an actual weight greater than the weight of the ladder. A linkage is connected between the counterweight and ladder at a lift angle that varies as the ladder is raised and lowered to cause the counterweight to exert an actual lifting force that is sufficient to overcome the ladder weight when the ladder is in a raised position and that is less than the weight of the ladder when the ladder is in its lowered boarding position to automatically maintain the ladder in either position without the need for a latching mechanism.

12 Claims, 4 Drawing Sheets

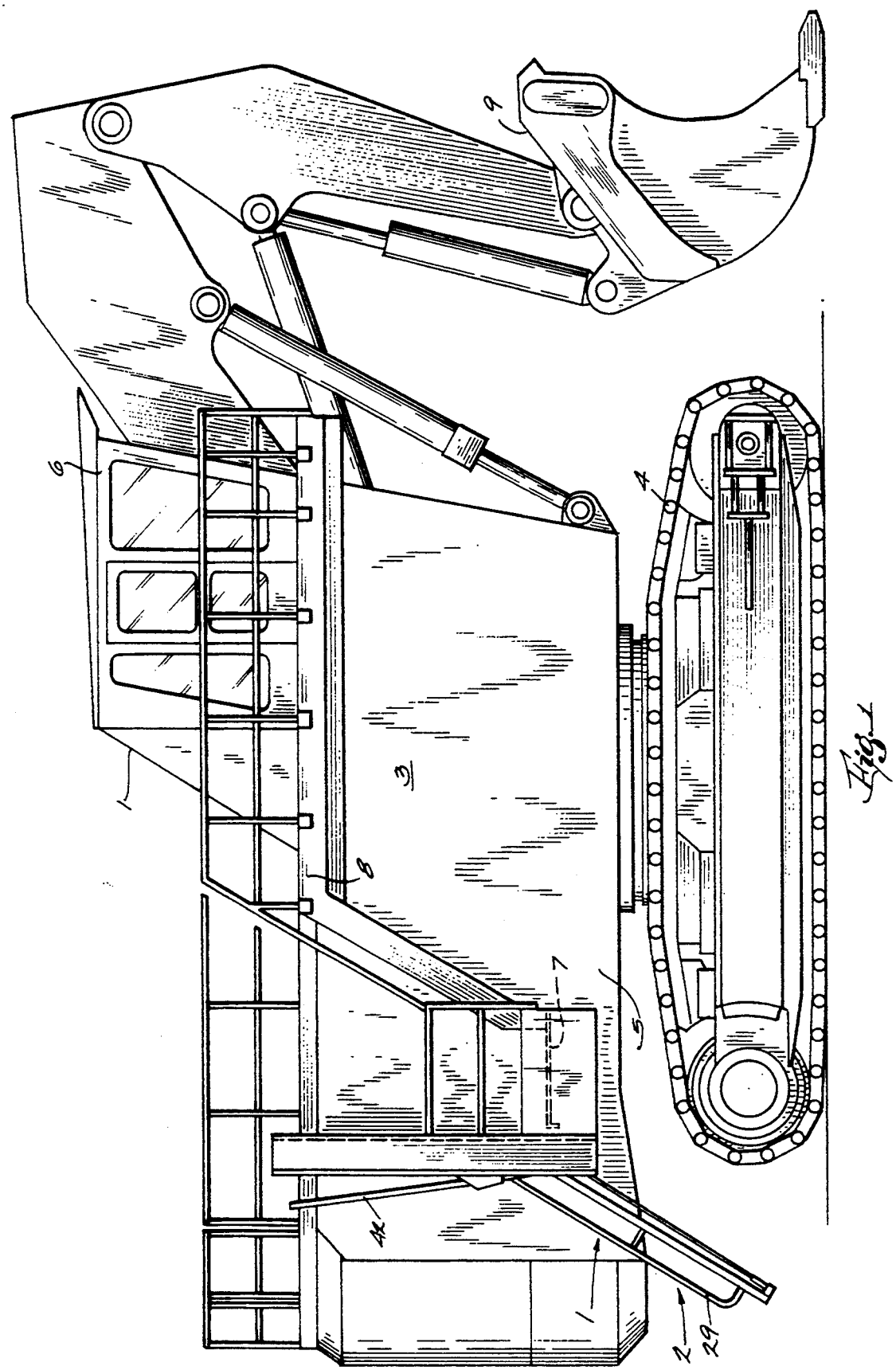

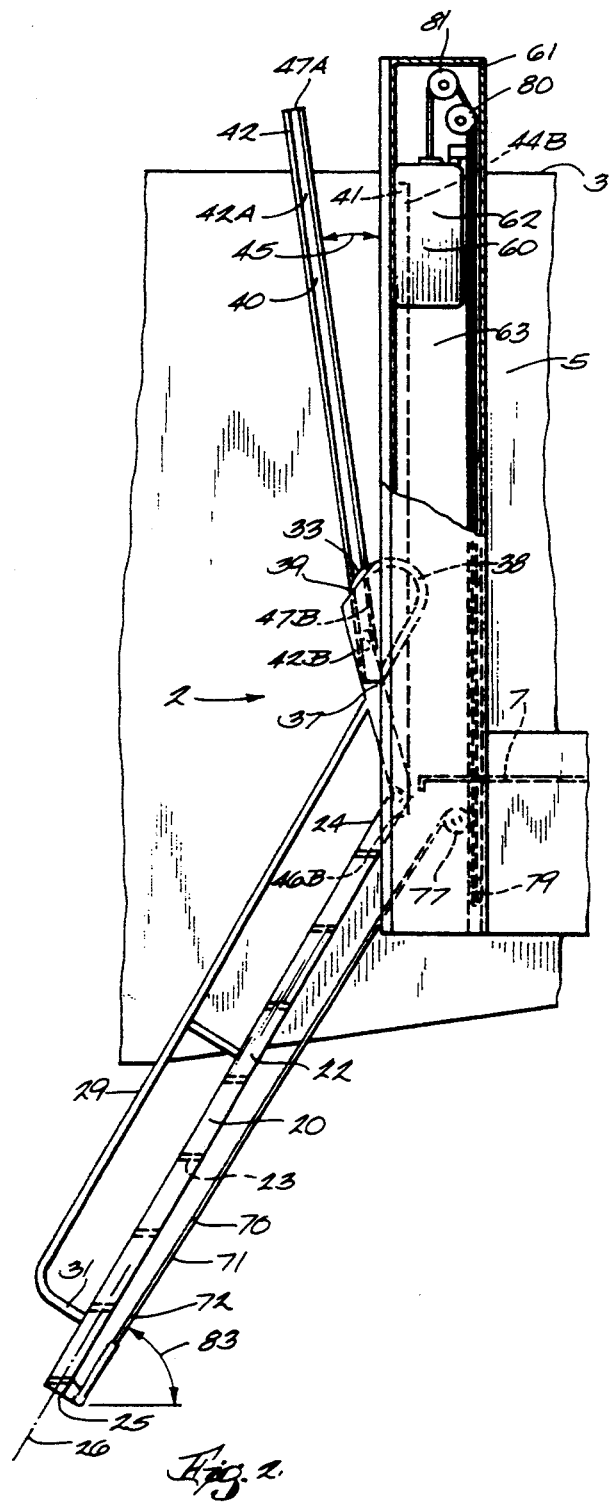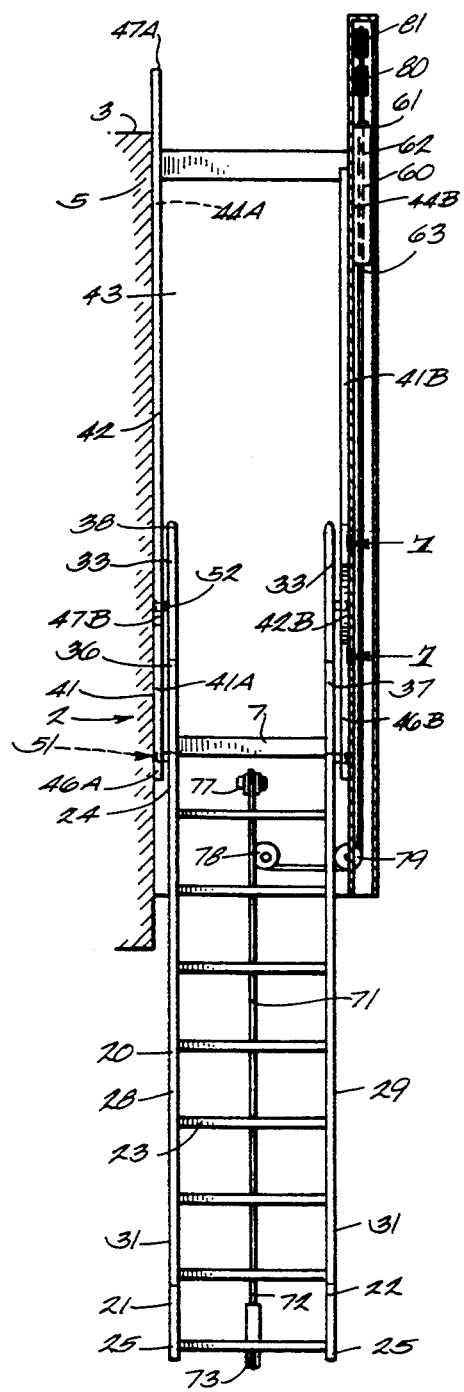

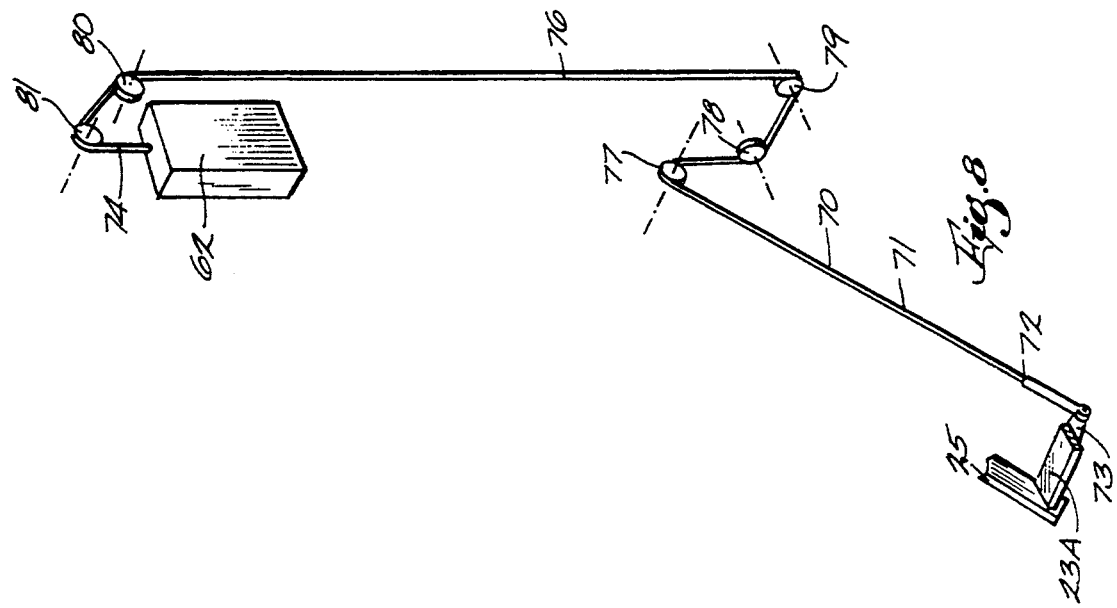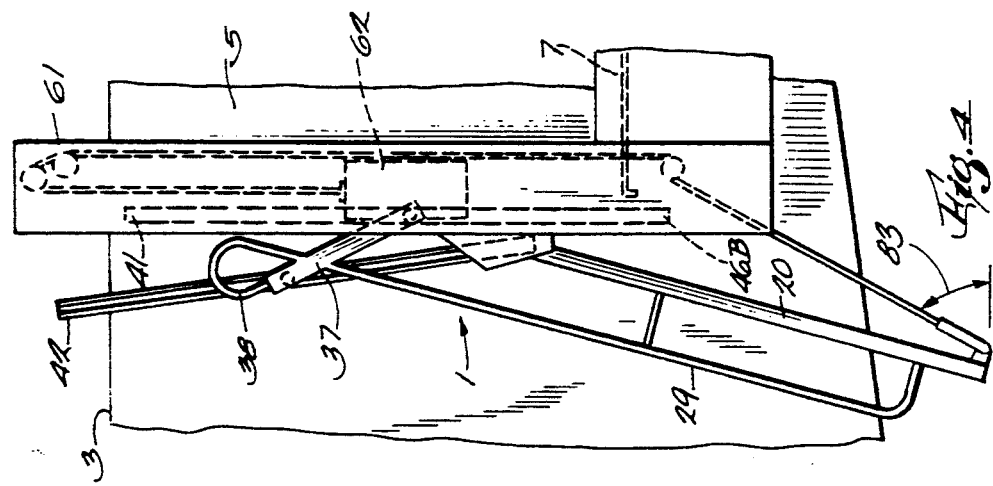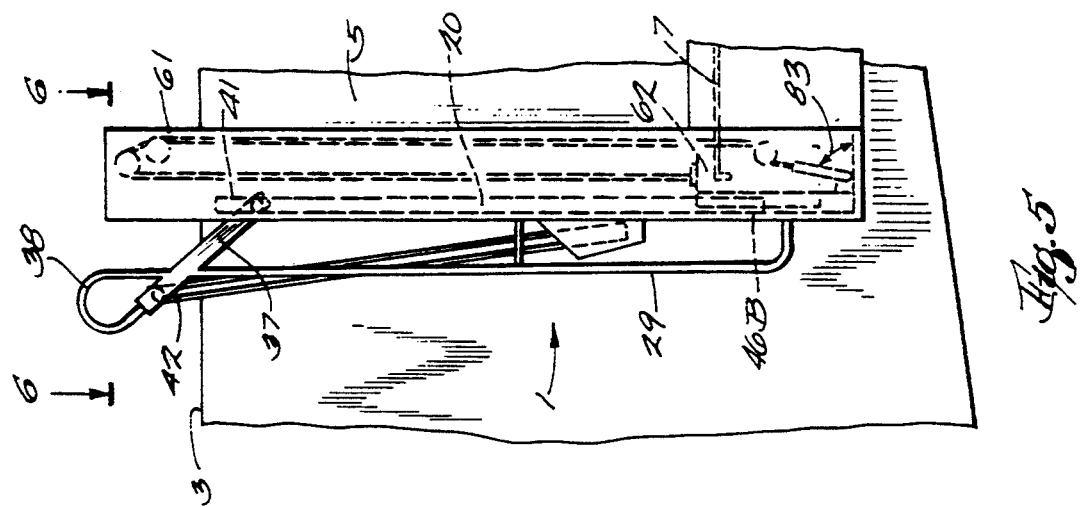

BOARDING LADDER ASSEMBLY HAVING A VARIABLE COUNTERWEIGHT LIFTING FORCE

BACKGROUND OF THE INVENTION

The present invention relates to an assembly for mounting a boarding ladder on a machine to allow movement of the ladder to either a raised storage position or a lowered boarding position.

Boarding ladders are required in a wide variety of installations such as, for example, on large excavating machines used in mining. The ladder is mounted on an excavator so that it can be pulled down to a lowered boarding position to enable the operator to climb onto the excavator, after which the operator must pull the ladder up to a raised storage position to allow operation of the excavator without damage to the ladder. Such ladders can weigh 165 lbs. or more and therefore it is necessary to provide some type of lift-lower assistance in the ladder mounting assembly to aid the operator in raising and lowering the ladder.

Boarding ladder assemblies generally include two types of lift-lower assistance: counter balancing spring mechanisms and counter weight mechanisms. With both types of lift-lower assistance it is necessary to mechanically secure the ladder in its raised or lowered position by some type of latching mechanism. Boarding ladders are normally of such a length that it is impossible for the operator to activate the latch mechanism from both the top and the bottom of the ladder without some type of latch actuating linkage that extends so as to be accessible from both the top and the bottom of the ladder. Such latch mechanisms are expensive to manufacture and are prone to malfunction or breakage. If the latch mechanism becomes inoperative, the ladder cannot be held in its raised or lowered position. This interferes with the operation of the excavator. Further, latch mechanisms are disliked by operators because the latching and unlatching operation takes time.

SUMMARY OF THE INVENTION

A need exists for a simple, low cost boarding ladder assembly that will angularly orientate the ladder for convenient boarding when in its lower position, will provide lift-lower assistance and will securely maintain the boarding ladder in either its raised or its lowered position without the need for a latching mechanism.

The invention provides a boarding ladder assembly for an excavator, the assembly comprising: a boarding ladder; a guide means for mounting the boarding ladder on the excavator for movement between raised and lowered positions; a counterweight having an actual weight that is greater than the weight of the ladder; and a linkage that interconnects the counterweight to the ladder to cause the counterweight to exert on the ladder an actual lifting force that varies in magnitude depending upon the position of the ladder. When the ladder is in its raised storage position, the lifting force is sufficient to overcome the weight of the ladder to thereby maintain the ladder in the raised position. When the ladder is in its lowered boarding position, the lifting force is less than the weight of the ladder in order to maintain the ladder in the lowered position.

More specifically, the boarding ladder has a longitudinal axis and the linkage is connected to the ladder at a lift force exerting angle that varies, relative to the longitudinal axis of the ladder, depending upon the position of the ladder. Variation of the angle varies the magnitude of lifting force.

Preferably, the guide means for mounting the ladder on the excavator includes first and second guide tracks that are mounted in spaced, downwardly converging angular orientation relative to each other. First and second guide followers on the ladder are confined to movement in the first and second guide tracks, respectively. As the guide followers travel downward along the converging first and second guide tracks, the angled relation of the tracks causes the ladder to pivot from a raised, vertically oriented storage position to a lowered position presenting the ladder at a convenient angle for boarding.

BRIEF DESCRIPTION OF THE DRAWINGS

FIG. 1 is a side elevational view of a hydraulic excavator incorporating a boarding ladder assembly constructed in accordance with the present invention.

FIG. 2 is an enlarged, partial side elevational view, partly in section, of the hydraulic excavator of FIG. 1 showing the boarding ladder in a lowered boarding position.

FIG. 3 is a rear elevational view of the boarding ladder shown in FIG. 2 with portions in section.

FIG. 4 is a partial side elevational view similar to FIG. 2 showing the boarding ladder in a partially raised position.

FIG. 5 is a partial side elevational view similar to FIG. 2 showing the boarding ladder in a fully raised storage position.

FIG. 8 is a diagrammatic perspective view of the counterweight and the linkage which connects the counterweight to the boarding ladder.

Figure 6:
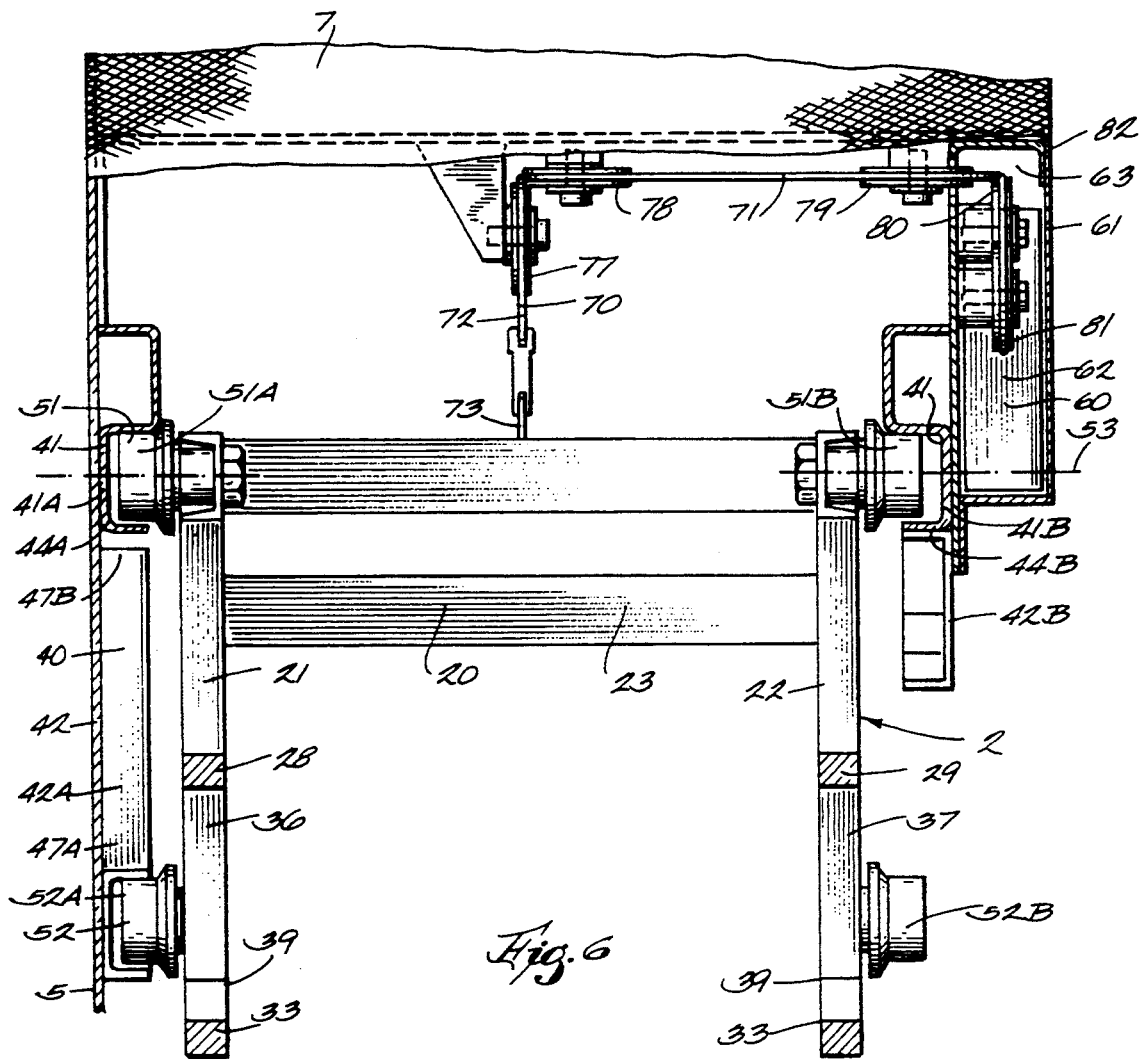
FIG. 6. is a sectional view of the boarding ladder assembly taken along line 6—6 of FIG. 5 with portions of the boarding platform broken away to show the counterweight sheaves and linkage.

Before one embodiment of the invention is explained in detail, it is to be understood that the invention is not limited in its application to the details of the construction and the arrangements of components set forth in the following description or illustrated in the drawings. The invention is capable of other embodiments and of being practiced or being carried out in various ways. Also, it is to be understood that the phraseology and terminology used herein is for the purpose of description and should not be regarded as limiting.

DESCRIPTION OF THE PREFERRED EMBODIMENT

Shown in FIG. 1 is a hydraulic excavator 1 comprising a boarding ladder assembly 2. The hydraulic excavator also comprises a machinery house 3 which is pivotally mounted in known manner upon a crawler type undercarriage 4. The machinery house 3 includes a sidewall 5, an operator's cab 6, a boarding platform 7, and a stairway-walkway structure 8 that provides access from the boarding platform 7 to the operator's cab 6. The excavator 1 also comprises an excavating bucket assembly 9 operable in known manner by an operator positioned in the operator's cab 6.

The boarding ladder assembly 2 comprises (see FIGS. 1, 2, 3 and 6) a support, i.e. the sidewall 5 of the machinery house 3; a boarding ladder 20; a guide means 40 for mounting the boarding ladder on the sidewall 5 of the machinery house 3 for movement between raised and lowered positions; a counterweight assembly 60; and a linkage means 70 for connecting the counterweight to the ladder 20 to assist in raising and lowering the ladder 20 and to maintain it in either the raised position or the lowered position.

As shown in FIGS. 2, 3 and 6, the boarding ladder 20 includes spaced apart sides 21, 22 each having upper and lower ends 24, 25 and a plurality of vertically spaced steps 23 connected between the sides 21, 22. The ladder has a longitudinal axis 26 and the steps 23 and sides 21 and 22 lie in a single plane with the axis 26. The ladder 20 further includes laterally spaced handrails 28, 29 each having a lower end 31 and an upper end 33. The lower ends 31 are connected to the lower ends 25 of the ladder sides 21, 22, and the upper ends 33 are connected to spaced apart handrail support members 36, 37 extending from the upper ends 24 of the side rails 21, 22, respectively. Each of the hand rails 28, 29 has a recurred portion 38 presenting a terminal end 39 connected to the associated handrail support member 36 or 37.

The guide means 40 for mounting the ladder 20 on the sidewall 5 of the excavator machinery house 3 will now be described with reference to FIGS. 2 through 6. The guide means 40 comprises first and second or front and rear guide track means 41 and 42. Referring specifically to FIGS. 3 and 6, the front guide track means 41 comprises inner and outer guide tracks 41A, 41B. The first inner guide track 41A is secured to the sidewall 5 of the machinery house 3 of the excavator. The first outer guide track 41B is secured to a counterweight tower 61 which is secured to the sidewall 5 and spaced laterally therefrom on the outer side of the boarding platform 7. The counterweight tower 61 and the sidewall 5 define a doorway 43 leading from the upper end of the boarding ladder 20 onto the boarding platform 7. The inner and outer tracks 41A, 41B have upper ends 44A, 44B and lower ends 46A, 46B, respectively. The rear guide track means 42 comprises a rear inner guide track 42A mounted on the sidewall 5. The rear inner guide track 42A has upper and lower ends 47A, 47B. Each of the tracks 41A, 41B and 42A is a channel member opening toward the ladder 20. The rear track means 42 also comprises a short outer stub track section 42B (best shown in FIG. 7) mounted on the counterweight tower 61. There is no full length rear outer guide track corresponding to the full length rear inner guide track 42A.

The guide track means 41 and 42 are mounted in spaced upwardly diverging (or downwardly converging) angular orientation relative to each other as is best shown in FIG. 2. The tracks 41A and 41B are mounted in a vertical position and the tracks 42A and 42B are positioned at a fixed angle (identified by reference numeral 45) relative to the tracks 41A and 41B and serve to angularly orientate the ladder 20 as it is raised and lowered in a manner to be further described.

Figure 7:
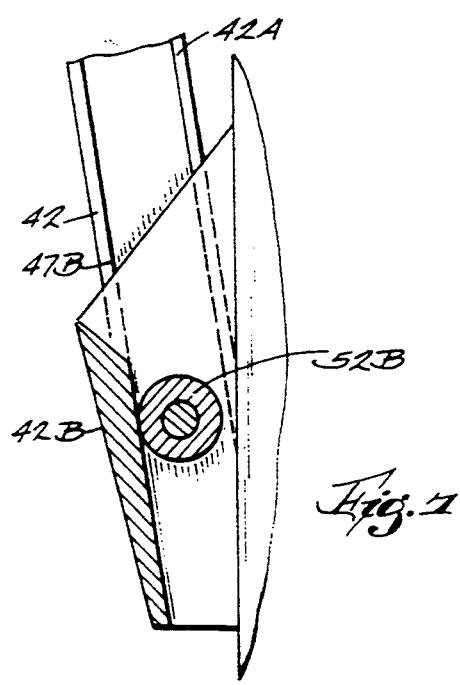
FIG. 7 is an enlarged, partial sectional view taken along line 7—7 of FIG. 3.

Referring to FIGS. 3, 6 and 7, the guide means 40 also comprises first and second or front and rear guide follower means 51 and 52. The front guide follower means 51 comprises inner and outer rollers 51A and 51B which are mounted adjacent the top ends 24 of the ladder sides 21, 22, respectively, and which are received in inner and outer guide tracks 41A, 41B, respectively. The rear guide follower means 52 comprises inner and outer rollers 52A, 52B which are mounted adjacent the ends 39 of the inner and outer hand rail support members 36, 37, respectively. The rear inner roller 52A is in register with the second guide track 42A. The rear inner roller 52A serves to angularly orientate the ladder 20 about a first pivot axis 53 (FIG. 6) on which the first inner and outer guide follower rollers 51A and 51B are mounted. The second outer roller 52B serves a stabilizing function when the boarding ladder 20 is in its lower boarding position as will now be described.

Referring to FIGS. 6 and 7, the guide means 40 includes a lower stabilizer means in the form of the stub track section 42B, which is mounted in a position laterally spaced outward from the lower end 47B of the rear inner guide track 42A. Referring to FIG. 7, the lower stabilizer stub track 42B is contacted by rear outer roller 52B when the boarding ladder 20 is in its fully lowered position (shown in FIG. 2). Contact of roller 52B with the stub track 42B stabilizes the upper end 24 of the ladder 20.

The counterweight assembly 60 will now be described with reference to FIGS. 2, 3, 4, 6 and 8. The counterweight assembly 60 includes a counterweight 62 which has an actual weight that is greater than the fixed weight of the ladder 20. The counterweight 62 is suspended by the linkage means 70 to travel up and down within a vertically extending compartment 63 within the counterweight tower 61.

Referring to FIGS. 2, 3, 4, 6 and 8, the linkage means 70 comprises a rope member 71 such as wire cable which has one end 72 connected to a bracket 73 on the lowermost ladder rung 23 and its other end 74 connected to the top of the counterweight 62. The intermediate run 76 of the rope member 71 is trained over a series of five sheaves 77, 78, 79, 80 and 81 as best appears in FIG. 8. The sheave members 77, 78, 79 serve to transfer the intermediate run 76 of the rope member 71 laterally from the center of ladder 20 to the counterweight tower 61 (FIG. 6). From sheave 79 the rope member 71 passes upwardly and over sheaves 80 and 81 and then downwardly to the top of counterweight 62.

The operation of the boarding ladder assembly 2 will now be described starting with the boarding ladder 20 in its lowered boarding position as shown in FIG. 2. When the ladder is in its lowered boarding position the rope 71 has an effective lifting angle as indicated by reference numeral 83. The lifting angle 83 causes an actual lifting (or vertical) force component with a magnitude less than the weight of the ladder to be exerted on the ladder 20. For example, if it is assumed that the ladder weighs 165 lbs., the counterweight weighs 180 lbs. and the effective lifting angle 83 is 58°, the actual lifting force exerted on the ladder in its lower position is about 153 lbs., which is less than the weight of ladder 20. The ladder 20 is therefore retained in this position without any type of latching mechanism. However, the operator only need exert a lifting force above 12 lbs. in order to overcome the weight of the ladder 20 and move it upwardly from the lower position.

Referring now to FIG. 4, it will be noted that as the ladder is raised the effective lifting angle 83 gradually increases until at an intermediate position (shown in FIG. 4) the lifting angle 83 causes an actual effective lifting force greater than the weight of the ladder to be exerted on the ladder. The lifting angle 83 increases because of the interaction between the guide tracks 41A, 41B, 42A and the rollers 51A, 51B, 52B. Because the rollers are confined to movement along the tracks, the divergence of the tracks 41A, 42A changes the angle of the ladder 20 (i.e., the angle of the axis 26 with respect to vertical). This causes the lower end of the ladder 20 to move more directly beneath sheave 77 and thereby causes the lifting angle 83 to increase. It should be noted that, without the diverging tracks changing the angle of the ladder, the lifting angle 83 would actually decrease in response to upward movement of the ladder 20.

When the ladder has been raised approximately half way, the effective lifting force of counterweight 62 exceeds the ladder weight and pulls the ladder 20 up to its fully raised position as shown in FIG. 5. In the raised position the lift force angle 83 is approximately 80°. At a lifting angle of 80°, the magnitude of the vertical lifting component is almost 178 lbs., or approximately 13 lbs. more than the ladder weight. Thus, the ladder 20 is maintained in its raised position without a latching mechanism.

When the operator needs to lower the ladder to disembark from the excavator, he only needs to exert a force of approximately 13 lbs. to overcome the effective lifting force of the counterweight and cause the ladder to start to descend to its lower position.

As the ladder 20 is lowered, the orientation of the ladder 20 changes, i.e., the angle of the ladder axis 26 with respect to vertical increases, so that the ladder 20 is presented at a convenient boarding angle when in its lowered position. At the same time, the lifting angle 83 decreases, causing the actual lifting force exerted on the ladder 20 by the rope 70 to decrease.

Various features of the invention are set forth in the following claims.

I claim:

1. A boarding ladder assembly comprising:
   a support;
   a boarding ladder having a fixed weight and a longitudinal axis;
   a guide means for mounting said ladder on said support for movement between raised and lowered positions, said guide means comprising first and second guide track means mounted in spaced diverging side-by-side orientation relative to each other and defining an acute angle therebetween, and first and second guide follower means located on said ladder and mounted on said first and second guide track means respectively for following said guide track means as said ladder is raised and lowered;
   a counterweight having an actual weight greater than said fixed weight of said ladder; and
   a linkage means for connecting said counterweight to said ladder to cause said counterweight to exert on said ladder an actual lifting force component that varies between a first magnitude when said ladder is in said raised position and a second magnitude when said ladder is in said lowered position, said first magnitude being sufficient to overcome said ladder fixed weight to maintain said ladder in said raised position, and said second magnitude being less than said ladder fixed weight to maintain said ladder in said lowered position.

2. The boarding ladder assembly according to claim 1 wherein said linkage means is connected to said ladder at a lift force exerting angle that varies relative to said longitudinal axis depending upon the position of said ladder.

3. The boarding ladder assembly according to claim 1 wherein said linkage means includes a rope member connected between said ladder and said counterweight.

4. The boarding ladder according to claim 1 wherein:
   said ladder has a top end;
   said first and second guide track means diverge upwardly; and
   said first guide follower means is mounted proximal to said top end of said ladder.

5. The boarding ladder assembly according to claim 1 wherein:
   said ladder has spaced apart sides lying in a plane;
   one of said guide track means includes first inner and outer guide tracks in spaced parallel relation to said ladder sides when said ladder is in said raised position; and
   the other of said guide track means includes a second inner guide track adjacent one of said ladder sides when said ladder is in said raised position, said second inner track diverging angularly from said first inner guide track.

6. The ladder assembly according to claim 5 wherein said other guide track means includes a lower stabilizer means adjacent the other of said ladder sides.

7. The boarding ladder according to claim 1 wherein:
   said boarding ladder has spaced apart inner and outer side rails each having a top end, a bottom end and a hand rail support member mounted adjacent said top end; and
   said second guide follower means is mounted on said inner hand rail support member.

8. The boarding ladder assembly according to claim 1 wherein:
   said ladder has a bottom end; and
   said linkage means includes a flexible element having opposite ends, one of said ends being connected to said ladder adjacent said ladder bottom end and the other end being connected to said counterweight.

9. The boarding ladder assembly according to claim 8 wherein:
   said linkage means includes a sheave means rotatably mounted on said support above said ladder bottom end; and
   said flexible element is reeved on said sheave means.

10. A boarding ladder assembly comprising:
    a support;
    a boarding ladder having a longitudinal axis;
    means mounting said boarding ladder on said support for movement between an uppermost storage position and a lowered boarding position and for automatically disposing said boarding ladder at a convenient boarding angle relative to vertical when said ladder is in said lowered boarding position, said mounting means comprising first and second guide track means mounted in spaced diverging side-by-side orientation relative to each other and defining an acute angle therebetween, and first and second guide follower means located on said ladder and mounted in said first and second guide tracks respectively for following said guide tracks as said ladder is raised and lowered; and
    a counter balancing means connected between said ladder and said support for exerting on said ladder a variable lifting force that is greater than the weight of said ladder when said ladder is in said uppermost position, less than the weight of said ladder when said ladder is in said lowered boarding position, and never decreases as said ladder moves from said lowered position to said uppermost position.

11. A ladder assembly comprising
    a support,
    a ladder, and means for mounting said ladder on said support for movement between a raised position in which said ladder extends substantially vertically and a lowered position in which said ladder extends at a boarding angle relative to vertical, said mounting means including generally vertically extending, diverging side-by-side first and second tracks mounted on said support, said first and second tracks defining an acute angle therebetween, and first and second track followers which are mounted on said ladder and which follow said first and second tracks, respectively.

12. A boarding ladder assembly according to claim 11 wherein said tracks diverge upwardly.

* * * * *